July 6, 1937.   E. H. HERRICK   2,086,080
ART OF TREATING DISTILLED BEVERAGES
Filed July 10, 1934   2 Sheets-Sheet 1

INVENTOR,
Elias Hicks Herrick,
BY
ATTORNEYS

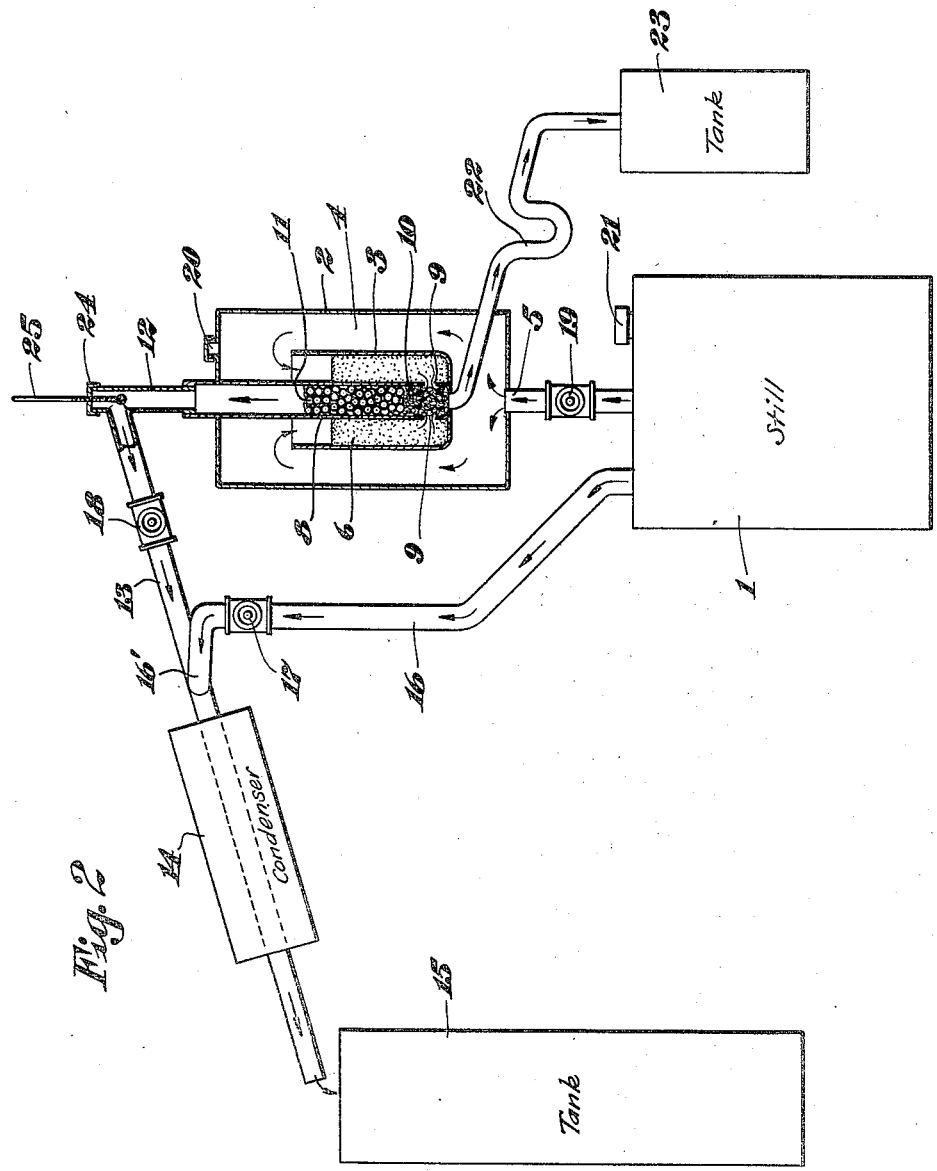

Patented July 6, 1937

2,086,080

UNITED STATES PATENT OFFICE 2,086,080

ART OF TREATING DISTILLED BEVERAGES

Elias Hicks Herrick, New York, N. Y.

Application July 10, 1934, Serial No. 734,467

19 Claims. (Cl. 99—48)

This invention relates to the treatment of whiskey and other distilled liquor beverages.

One object of the invention is to improve the quality of distilled liquor beverages.

A further object of the invention is a novel process or treatment for removing the unpalatable, while retaining the palatable, qualities of comparatively new distilled liquor beverages.

A further object of the invention is to impart palatable qualities to raw, comparatively new or unaged distilled liquor beverages.

A further object of the invention is to impart palatable qualities to raw or comparatively new distilled liquors by a novel process which involves the removal of elements which are responsible for the unpalatable taste or quality of such raw or new beverage without removing the elements which impart thereto the palatable qualities.

A further object of the invention is a novel treatment or process for imparting to raw or comparatively new distilled liquor beverages the palatable qualities possessed by such beverages when aged according to the conventional methods, and particularly such a treatment or process which can be effected in a comparatively short time and in an economical manner.

A further object is a novel process for treatment of new distilled liquor which involves the addition of no harmful chemicals or ingredients to the beverage during the treatment or imparting thereto any other harmful effects.

A further object of the invention is a novel method of increasing the alcoholic content of the distilled liquor.

For a better understanding of the invention reference may be had to the following specification and drawings wherein:

Fig. 2 is a drawing diagrammatically illustrating an apparatus for practicing the invention.

Figure 1:
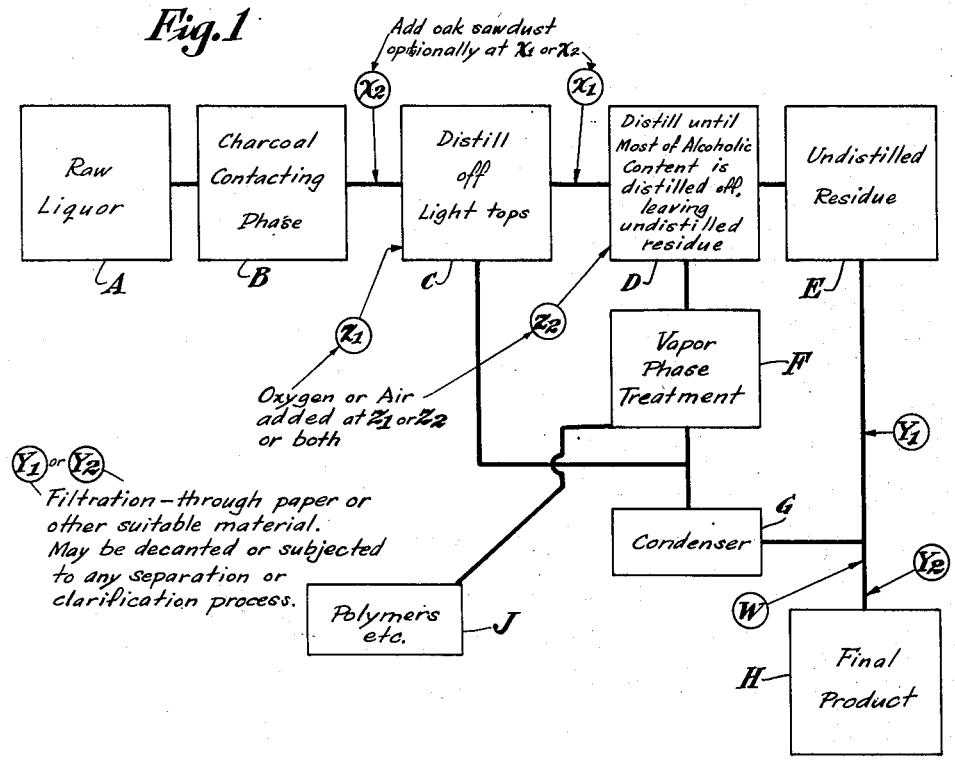
Fig. 1 is a flow sheet diagrammatically illustrating the invention.

I have found that raw whiskey and the like, by subjecting it to certain treatment in liquid form and contacting a part, but only a part of it, in vapor form with a catalyst, such as activated charcoal or carbon, may be aged in a comparatively short time and given a palatable quality equal to that possessed by whiskey aged in the conventional manner by four years' storage or longer. The part which is not distilled and treated in vapor form includes that which is less volatile and low in alcoholic content. The whole of the more volatile or the distilled part of the liquor may be subjected, while in the vapor form, to the catalyst or activating material or only certain selected fractions thereof may be so treated, and I prefer to by-pass the light tops, say that including the first 5% to 10% alcoholic content, and to subject only the intermediate distilled fractions to the vapor phase treatment.

The treatment in liquid form includes subjecting the charge, preferably during the vapor phase treatment, to a special flavoring and coloring step or steps, as by subjecting it to oak sawdust and the like or by contacting it with oxygen, or by other treatment, all as more particularly described below, and in cases where the liquor is very raw it is preferable to contact the whole original charge with a catalyst such as activated charcoal or carbon as a step preceding the partial vapor phase treatment. The condensates both from the light tops when thus by-passed and from the treated vapors are then combined with the undistilled and specially treated residue to form the final product.

While I do not desire to be confined to any particular theory underlying my process, I attribute its effectiveness to the separate and individual treatments, each particularly adapted for the purpose to the particular portion being treated. For example, the fractions subjected to the vapor phase treatment apparently contain the greater portion of the elements responsible for the unpalatable tastes of the raw whiskey and these are removed or beneficially changed in that treatment. On the other hand, the less volatile or undistilled part contains elements responsible for certain desirable or palatable qualities which would be impaired if that part were distilled or subjected to the vapor treatment, and, accordingly, that part is treated in a manner to both retain and preserve these desirable qualities, as well as impart flavor and color thereto, while the light tops appear to contain delicate elements of flavor and bouquet which are removed or impaired if treated catalytically in the vapor state.

In the preferred treatment in liquid form the material to which the raw liquor under treatment is subjected is some material which will absorb certain undesirable elements and also give out certain ingredients that will impart the required color and taste. The material used for this purpose is preferably the same as or similar to that which is present in the container in which liquor is ordinarily stored for aging under conventional practice, such as well seasoned oak, so as to impart to the liquor the same or similar color and taste effects as are produced by storing liquor in oak casks for a considerable length of time. These storage casks usually have their interior surfaces scorched or charred with which surfaces the liquor being aged contacts, and best results are obtained, as indicated above, by subjecting the distilled whiskey being aged to similar oaken material. The oak may be in any form that facilitates the action upon the material, as for example in the form of shavings or sawdust or pulverized or powdered or finely divided to the point desired or any combination of these. The finely divided oak may be introduced into the liquor at any one or more appropriate stages in the treatment, but good results are obtained by having it present in the liquor during distillation, and particularly during the vapor phase treatment, although it may be also present during the distillation of the light tops. The oak sawdust thus introduced into the still in the presence of the liquor under treatment yields elements which together forms an extract for coloring the liquor and imparting to it an aroma and flavor. It also tends to function as an absorption medium and to remove from the raw liquor under treatment undesirable elements or higher alcohols such as fusel-oil, etc.

The introduction of oak in solid form is preferred, but a certain degree of flavoring or coloring or both may be obtained by introducing a prepared extract into the liquor corresponding to the flavoring and coloring obtained by the ordinary process of aging in oak casks. For example, an extract made from oak, other wood, etc., may be used and introduced into the liquor. The extract may be prepared in any suitable manner, as for example by adding the oak to water or alcohol or a combination of liquids and by heating, boiling, allowing it to stand or otherwise extracting the flavoring and coloring and/or other desired portion or portions. The use of such a prepared extract also enables me to reduce or change, at the time or point of adding it, the alcoholic content of the liquor being treated.

At the time that the material is added either as a solid or as a prepared extract the whole may be agitated to insure most favorable conditions for obtaining the desired result or allowed to stand for a time, or both. The amount of sawdust or like material added depends on the color, flavor, etc. it is desired to obtain in the final product.

The flavor derived from oak sawdust may also be obtained to a certain degree by contacting the vapors during the vapor phase treatment with the sawdust or with an oak extract, though I prefer to introduce the sawdust into the liquor being distilled so as to also act on the undistilled residue as above described. For example, the catalyst utilized in the vapor phase treatment may be treated or soaked with an extract from oak or the sawdust may be incorporated bodily in the catalyst with which the vapors contact, or may be disposed on top of such material or at the bottom thereof or otherwise disposed in the path of the vapors.

A distinctive flavor or bouquet is obtained if the charcoal or other catalytic substance used in the vapor phase step is especially prepared or treated to impart to the vapors such flavor or bouquet. For example, the catalyst may be treated or soaked with a previously aged liquor, or sherry or other beverage having the desired flavor, or with the high aroma esters, etc. or mixed with fruits which yield the desired flavor, such as berries. The charcoal used in the liquid contacting step described below may be similarly treated.

I have found that contacting the distilled liquor during the vapor phase step with oxygen imparts qualities to the liquor which, together with those imparted in the other part of the process, produce a better product, and particularly when dealing with certain raw products. This may be effected in any suitable manner, but the preferred method is to cause the oxygen to bubble upwardly through the liquor during distillation and to become heated thereby and to go off with and become thoroughly mixed with the distilled vapors as they pass upwardly through the vapor phase chamber in contact with the carbon. The oxygen may be introduced in any form, as for example as pure oxygen or as air, and ozone may be used in some instances for this purpose, though air or pure oxygen is preferred. For example, oxygen may be introduced into the liquor while the partial distillation is taking place, or after distillation into either the distillate or the undistilled part or both separately or also after the distillate and the undistilled part have been reunited. The contacting may be effected by causing the air, oxygen, or ozone to bubble through the liquor during distillation.

As a step preceding the partial distillation and the vapor phase treatment, I prefer to treat the whole body of the beverage by bringing it into intimate contact with a catalytic agent, such for example as activated charcoal or carbon.

This liquid contacting step when employed is to insure that all or substantially all of the liquid contacts with and is affected by the catalyst or agent used, to a degree in the same way or in a similar way to that which would take place if, for example, the liquor were stored according to conventional practice for a considerable space of time in a container that had been previously charred on the inside, as for example an oak cask.

The charcoal or carbon or other agent used may be made from willow wood or oak or other suitable substances, and may be of any suitable form to facilitate the contacting, such as powdered or ground or unground or in broken pieces. The liquor may be contacted one or more times depending upon the length of time a contact is maintained and upon the characteristics of the liquor under treatment. When the liquor to be treated already has desired characteristics, such for example as color, which would be affected or impaired thereby, this liquid contacting treatment may be omitted, as for example, when the liquor is already partially aged. Even with raw liquor, a merchantable product may be often obtained without this liquid contacting treatment.

The catalyst or agent used in the liquid contacting step and that used in the vapor phase treatment of the intermediate fractions are both preferably activated by any suitable commercial process. I have obtained good results with charcoal which had been activated by chemical treatment and was neutral. The catalyst may be activated by the commercial air and steam methods. The activated material used in the vapor phase treatment is, as indicated, preferably activated prior to the introduction into the catalytic chamber, although oxygen, air, ozone or a combination of these when utilized in the process and caused to be introduced into the liquor during distillation as by being caused to bubble through the liquor under treatment, tends to activate or maintain the activated character of the carbon, particularly if there is introduced an excess of such oxygen, air, ozone, etc.

When the vapor phase treatment is finished, the liquid (either the undistilled part or the mixture of this part with the distilled part) may be filtered or otherwise freed of the material no longer required, the distillate and the undistilled portion being reunited either before or after filtering. The distilled part will ordinarily not contain solid matter to be strained out, but such part may be separately treated. The re-united liquid may be allowed to stand for a time and after that filtered or otherwise rid of the material no longer required.

Provision is preferably made for the recovery of certain liquids that may form during the vapor phase treatment which portion so recovered I will refer to as "polymers" and this may be utilized for any desired purpose.

I have indicated in Fig. 1 a flow sheet indicating schematically a preferred form of my invention. In this sheet A indicates the raw liquor supply to be treated, B treating the raw liquor by bringing it in liquid form into intimate contact with charcoal or the like, C the distillation of the light tops and by-passing the same to the condenser G, and D the further but partial distillation to a point where the greater portion of the alcoholic content has been distilled off. The vapors from the last distillation are subjected to the vapor phase treatment at F and then led to the condenser G, and the undistilled part or residue indicated at E is passed on to the chamber H to be combined in the desired proportions with the condensates flowing from the condenser G. J indicates the polymer receiving chamber $X_1$ indicates the point where the oak sawdust is admitted so as to be present during the distillation of the fractions to be passed through the vapor phase chamber. The sawdust may also be introduced at $X_2$ and therefore be present during the distillation of the light tops which are by-passed. The oxygen or the like for contacting the liquor may be added at $Z_1$ or $Z_2$ or both, as by causing it to bubble through the liquid under treatment. $Y_1$ and $Y_2$ indicate points where, if desired, the liquids may be filtrated, as by passing through paper or other material to remove the sawdust or other foreign material or it may be decanted or subjected to any separation or clarification process. At W there may be a pause of a few days or a week or more, if desired, to permit the liquor to stand.

When the distillation through an apparatus provided with such a catalyst is stopped at a certain point or when substantially all the alcohol content of the material being treated has been taken off, as is preferred, we have the undistilled portion or residue, the distilled portion or portions, the material extracted by and remaining in the activating material and the so-called polymers, assuming that the type of apparatus used permits the separation of these polymers. Any one of these may be treated while separate or any two or more may be united and treated. For example the polymers may be treated and ultimately returned to form part of the whole or they may be discarded. The undistilled portion may now be treated or simply filtered or otherwise separated from any undesired portion it contains. The distillate may be treated or redistilled, etc., but if filtering is effected prior to starting the distillation or no filtering is required and if the distillate is found to be free from objectionable ingredients, bearing in mind the result it is desired to accomplish, the distillate may now be combined with the undistilled portion, the polymers rejected, if desired, and the combination of distillate and undistilled portions filtered or otherwise clarified, if desired, or this combination may be first agitated to insure thorough mixing and/or allowed to stand for a time or both and then filtered or otherwise clarified. It may be clarified, as for example by centrifugal separation.

The portion of the beverage being treated that passes through, by or in intimate contact with the catalytic material while wholly, largely, or partially in the vapor phase, leaves in the catalyzing material or in the polymer outlet all or a part of the undesirable ingredients it contained, or those which continue with the vapor are beneficially affected.

Any suitable apparatus may be employed for practicing the invention. I have indicated diagrammatically in Fig. 2 such an apparatus for practicing the partial vapor phase treatment. This comprises an evaporator or still 1 for containing the original charge of raw liquor beverage from which a selected part is to be distilled and specially treated. Above the still 1 is a tower 2 in which is disposed a cylindrical catalytic chamber 3, forming an annular passage or chamber 4 around the catalytic chamber which communicates with the passage 5 leading from the still 1. The chamber 3 contains a body of activated material 6, such as charcoal or carbon in the granular form. The catalytic chamber 3 is in communication at its upper end with the annular passage 4, and disposed within the catalytic chamber is a fractionating chamber 8 having openings 9 near or at the bottom thereof establishing communication between the lower end of the chamber 3 and the fractionating chamber 8. The chamber 8 contains in the bottom thereof glass wool 10, this glass wool being disposed adjacent the openings 9 and thereby preventing the entry of the material 6 into the fractionating chamber. Any other suitable material or method may be used for screening the openings 9. A fractionating material or substance, such as glass beads, etc. 11 is also disposed within the fractionating chamber 8 and rests upon the glass wool 10. In the particular schematic embodiment shown, the fractionating chamber 8 is formed of a tubular structure passing out through the top of the tower 2, and it communicates with a condenser 14 through pipes 12 and 13. From the condenser 14 the condensed vapors flow to a receptacle or receiver 15. The condenser 14 is also in communication with still 1 by means of the by-pass tube or pipe 16, the latter communicating with the pipe 13 in advance of the condenser 14. A control valve 17 is disclosed in the pipe 16 and the latter preferably joins the tube 13 by means of a horizontal elbow 16', or said elbow 16' may be inclined, to avoid back flow of condensed vapors into the pipe 16. A control valve 18 is disposed in the pipe 13 between the fractionating chamber 8 and the connection of pipe 16 therewith and a similar control valve 19 is disposed in the passage 5 leading from the still 1 to the tower. At 20 is indicated an opening leading into the tower 2 at the top for obtaining access thereto, as for example for introducing activated material 6, such as activated carbon or charcoal, into the catalytic chamber 3. The still 1 may be provided with one or more openings for the introduction of the original charge of distilled liquor to be treated or for other purposes, as for example the introduction of air, oxygen, ozone and the like which may be caused to bubble or pass through the charge of liquor within the still. Such an opening is shown at 21. Trap 22 is shown leading from the bottom of the fractionating chamber 8 to a suitable receptacle 23. I have indicated an opening covered by a cap 24 in line with the pipe 12 and at the juncture of the pipes 12 and 13, this being for the purpose of obtaining access to these pipes, as for example for the purpose of inserting a thermometer 25. This opening also affords access to the fractionating chamber 8 or the pipe 12 may be detachably connected with this chamber for the purpose of affording access thereto.

The distillation of the charge of raw liquor contained in the evaporator 1 is carried far enough to distill off the fractions largely responsible for the unpalatable qualities of the raw liquor, and the resulting vapors of the fractions so desired to be treated are caused to pass upwardly to the tower 2 into the catalyst chamber 3 down through the carbon or other catalyst or activating material 6, and thence through openings 9 into the fractionating chamber 8 and thence through the glass wool 10 and into contact with the material 11. The function of the fractionating material such as glass beads 11, disposed in the column through which the vapors pass on the way to the condenser, is to facilitate the separation of the low boiling components from the high boiling components and to separate the polymers from the purified vapors. A small part of the vapors after contact with the activating material 6 may have been polymerized into a liquid or condensed in which case they pass through the openings 9 of the fractionating chamber 8 into the trap 22 and are collected into the receiver 23. A part of the vapors in the fractionating chamber 8 may be condensed, and this condensate runs back into the trap 22 and thence into the tank 23. From the chamber 8 the vapors pass through pipes 12 and 13 to the condenser 14. Here the vapors are condensed and the distillate passed to the receptacle 15 for mixing in the desired proportion with the undistilled part remaining in the still 1 or for other treatment described above. The first fractions being distilled, namely the first 5% to 10%, are ordinarily by-passed through the by-pass 16 without being subjected to treatment in the tower 2, through the manipulation of valves 17, 18 and 19, namely closing valves 18 and 19 and opening valve 17, or this may be done in a separate operation. Any intermediate fraction may thus be by-passed without undergoing the vapor treatment if desired.

The distillation may take place at atmospheric pressure, at pressures lower than atmospheric and even at pressure higher than atmospheric as practical conditions determine.

The contacting of the liquor in liquid form with carbon and the like is carried out in any suitable apparatus which it is deemed unnecessary to illustrate, and similarly with respect to the filtering following the vapor phase treatment. Ordinarily best results are obtained by distilling off to a point where substantially all the alcoholic content is distilled off, although fairly good results may be obtained without carrying the distillation to this point and preferably as described above the first fraction including the first 5% to 10% of the alcoholic content is by-passed. With raw bourbon whiskey of 54% alcoholic content by volume (108 proof), I have obtained good results by distilling off from approximately 50% to 60% of the original volume and treating certain of the vapors therefrom with activated carbon prior to condensation. I prefer to distill off very slowly the light tops which are to be by-passed.

As an example, the raw bourbon whiskey mentioned of approximately 108 proof and practically colorless is subjected to slow distillation at from 160 to 175° F. to drive off the light tops, which are by-passed, until approximately three parts by volume are distilled off (approximately 5% of the alcoholic content). The distillation is then continued until fifty-two additional parts by volume are distilled off leaving a residue or undistilled part of forty-five parts and during this further distillation the vapors are brought into intimate contact with activated charcoal. The liquor under treatment is contacted with oxygen (as for example by causing the oxygen to be bubbled through the liquor) both during the slow distillation of the light tops and the by-passing of the vapors and during the following distillation during the vapor phase treatment. The distillates resulting from the condensation of the by-passed vapors and specially treated vapors are then reunited with the residue. As described above, the liquor is subjected to finely divided oak at any one or more appropriate stages in the treatment, and in the example here given one and one-half to two parts by weight of oak sawdust is added to one hundred parts by weight of raw liquor and is present in the liquor during both the distillation of the light tops and the following distillation. If desired the product resulting from the reuniting of the distillates with the undistilled residue may be allowed to remain in contact with a charge of oak sawdust for a short period. As another variation the light tops are driven off and by-passed until 4% by volume is passed off (approximately 7.5% of the alcoholic content), the vapor phase treatment is then carried on until only about 40% by volume of the original body remains as an undistilled residue, and the oxygen and the oak sawdust are introduced after the distillation of the light tops.

While the oxygenating step mentioned in the examples is preferred with the particular raw product there dealt with, I have obtained satisfactory products without this step, products which are potable, palatable and satisfactory. Moreover, while the preferred process includes the driving off and by-passing of the light tops without subjecting these to the vapor phase treatment, I have obtained satisfactory products by applying the vapor phase treatment to both the light tops and intermediates.

As above described, the distillation of the light tops which are by-passed is effected at a very slow rate. This is preferred because it is desired to distill over only the very lightest portion of the liquor. Rapid distillation would tend to carry over some of the vapors which it is desired later to contact with the activated material in the vapor phase treatment.

The rate of distillation during the vapor phase treatment may be much greater, but the rate should be controlled so that the vapors are in contact long enough with the activated material to effect the purposes desired. The temperature of the liquid during the distillation, which preferably gradually increases as the distillation progresses, should not be permitted to go high enough to effect chemical changes, such as the decomposition of the flavoring and extract materials which I desire to retain. In the examples given the ultimate or highest temperature does not exceed 210–220° F.

Figure 3:
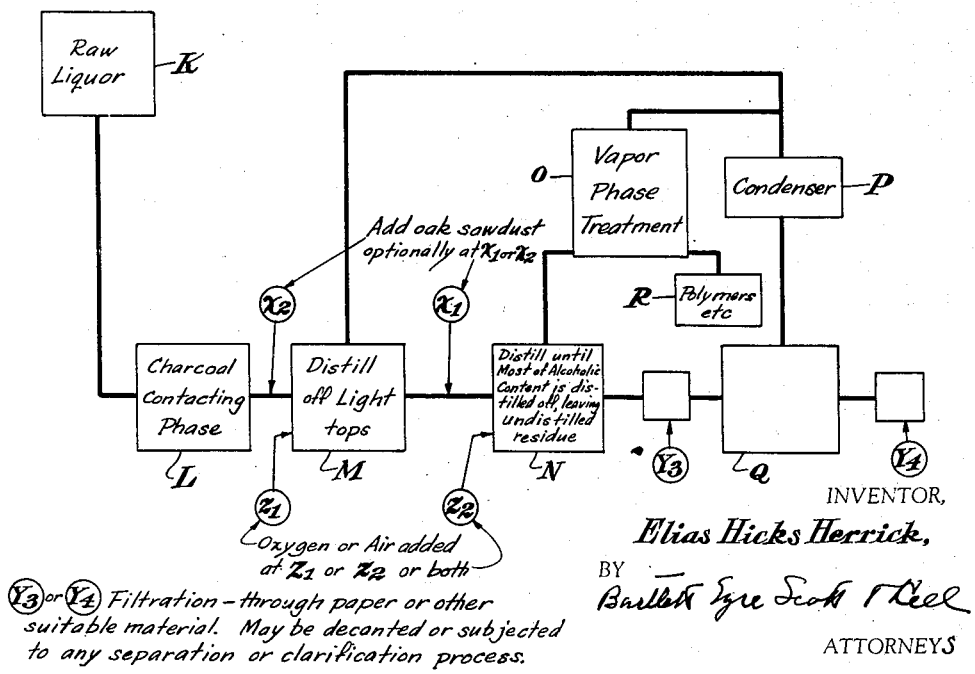
Fig. 3 is a view further diagrammatically illustrating the invention.

My invention may be carried out either according to the batch method or to the continuous distillation method and in Fig. 3 I have indicated diagrammatically a flow sheet indicating the continuous method. Here K indicates the raw liquor supply, L the subjection to the contacting treatment with activated charcoal or the like, M where the whole body being treated is subjected to a high enough temperature for a sufficient time to distill off the light tops described above which are to be by-passed to the condenser P. The remainder is then passed to the chamber N where the temperature is such as to distill off preferably to a point where the greater portion of the alcoholic content is distilled off, the vapors therefrom passing through the vapor phase treating chamber O and thence to the condenser P. Q indicates the receiver for the undistilled part flowing from N and for the condensates flowing from the condenser P. R indicates the polymer receiver attached to the tower O and $Y_3$ and $Y_4$ indicate filtration points where the liquids may be filtered. At $X_1$ or $X_2$ the oak sawdust is introduced in the required proportions. The liquor may be contacted with oxygen at either M or N or both ($Z_1$ or $Z_2$). By suitably regulating the rate of flow, the temperatures, etc., the process can be carried on in the continuous manner indicated.

My invention also enables me to increase the alcoholic content of the liquor without resorting to the customary fortification methods of adding alcohol or alcohol containing materials. In cases where for any reason we desire to increase the alcoholic content of the final mixture the distillation is carried to a point where practically nothing but water is coming off and from that point, carrying the distillation still further, the vapor is by-passed, condensed and received in a separate container and discarded, which will increase the alcoholic content of the final product after the various portions are combined. If this is not carried too far, any desired amount of this water can be discarded, without substantially affecting the quality of the product. As indicated above, the alcoholic content may be decreased by mixing with the undistilled part only a part of the distilled off and specially treated part.

I am able by my invention to obtain a palatable liquor beverage from an original body of raw or new liquor in a comparatively short time. Even with the complete or preferred process described I have found that such original body of raw liquor beverage may be converted into a palatable and merchantable quality in as short a time as say twenty-four hours, which is in marked contrast with the long time now required in the conventional aging process, namely four years or longer. The resultant product is ready either to blend with other liquors or to have added a proper amount of distilled water to reduce it to the alcoholic content desired for commercial purposes and marketed. The quality of the raw liquor may be substantially improved by subjecting the separated more volatile intermediate fractions in liquid form to the catalyst, but the preferred treatment is in the vapor form as described.

Liquor stored and aged under prior practice in charred barrels comes in contact with charcoal and/or carbon and wood and to a certain extent with air which is mainly composed of oxygen (an active gas) and nitrogen (an inactive gas) and sometimes old barrels or casks are used which have contained say sherry or liquor similar to that to be placed in them. The qualities imparted to the liquor according to my invention are similar to the qualities imparted to liquor when aged by storage for four years under the prior practice. No ingredients, substances or chemicals are introduced into the liquor at any stage of the process which would render the liquor injurious to the health. The reduction of the time element in the aging, in addition to the improved and often preferred quality, is an important object of this invention, whereby I am able to reduce the time element from four years to the short time above described for obtaining palatable and merchantable whiskey and other distilled liquors.

I may thus artificially age raw whiskey, raw brandy, raw rum and other distilled liquors.

Wherever I use the term "carbon" in the claims hereto annexed it is understood that the term "carbon" is to be construed as meaning any substance containing a substantial amount of carbon in a form in which it may be used in the applicant's process to produce the same effect, namely, porous carbon, such for example as charcoal, a large part of which is known to be carbon.

I claim:

1. The process of accelerating the aging of whiskey and other distilled alcoholic beverages, which consists in introducing into the liquor finely divided oak in the proportions of one hundred parts by weight of liquor to one and one-half to two parts by weight of oak, distilling off the more volatile compounds including the intermediate fractions to a point where the greater part of the alcoholic content is distilled off, leaving a less volatile undistilled residue of low alcoholic content, contacting the liquor with oxygen, bringing at least the intermediate fractions distilled off while in the vapor form into intimate contact with an activated carbon, recondensing the part distilled off and recombining the distillate with the remainder of the original body.

2. The process of accelerating the aging of whiskey, and other distilled alcoholic beverages which consists in distilling off the light tops to form one part, continuing the distillation until at least the major part of the alcoholic content goes off to form a second part, leaving an undistilled part to form a third part, subjecting the second part, while in the vapor form, to activated carbon to remove the raw qualities therefrom, and after recondensing the first and second parts reuniting them with the third part to blend the second part, thus beneficially treated with the first and third parts whose beneficial qualities have been retained.

3. The process of accelerating the aging of whiskey and other distilled alcoholic beverages which consists in distilling off the light tops to form one part rich in flavor and bouquet to be retained, continuing the distillation until at least the major part of the alcoholic content goes off to form a second part embodying raw qualities to be removed, leaving an undistilled part to form a third part rich in qualities to be retained, subjecting the second part, while in the vapor form, to activated carbon to remove the raw qualities therefrom bringing at least the third part in liquid form into intimate association with a material which imparts thereto the flavor and color derived from treatment with oak, and after recondensing the first and second parts reuniting them with the third part to blend the second part thus beneficially treated with the first and third parts whose beneficial qualities have been retained.

4. The process of accelerating the aging of whiskey and other distilled alcoholic beverages which consists in distilling off the light tops until from 5 to 10% of the alcoholic content goes to form one part, continuing the distillation until at least the major part of the alcoholic content goes off to form a second part, leaving an undistilled part to form a third part, subjecting the second part, while in the vapor form, to activated carbon material to remove the raw qualities therefrom, and after recondensing the first and second parts reuniting with the third part to blend the second part thus beneficially treated with the first and third parts whose beneficial qualities have been retained.

5. The process of accelerating the aging of whiskey and other distilled alcoholic beverages which consists in subjecting the beverage in liquid form to a flavoring and coloring material, distilling off the light tops until 5 to 10% of the alcoholic content goes off to form one part, continuing the distillation until at least the major part of the alcoholic content goes off to form a second part and leaving an undistilled part to form a third part, subjecting the second part, while in the vapor form, to activated carbon to remove the raw qualities therefrom and, after recondensing the first and second parts, reuniting the second and third parts with the first part to blend the second part thus beneficially treated with the first and third parts whose beneficial qualities have been retained.

6. The process of accelerating the aging of whiskey and other distilled alcoholic beverages, which consists in subjecting the beverage in liquid form to finely divided wooden chips, distilling off the tops including the intermediate fractions until at least the major part of the alcoholic content goes off leaving an undistilled part rich in qualities to be retained, subjecting at least the intermediate fractions of the distilled off part which embody raw qualities to be removed, while in the vapor form, to activated carbon to remove the raw qualities therefrom, and after condensing the distilled off fractions reuniting and blending the separately and individually treated parts.

7. The process of accelerating the aging of whiskey and other distilled alcoholic beverages, which consists in subjecting the beverage in liquid form to a flavoring and coloring material, distilling off the tops including the intermediate fractions until at least the major part of the alcoholic content goes off leaving an undistilled part rich in qualities to be retained, subjecting at least the intermediate fractions of the distilled off part which embody raw qualities to be removed, while in the vapor form, to activated carbon to remove the raw qualities therefrom, condensing the distilled off fractions and reuniting and blending the separately and individually treated parts.

8. The process of accelerating the aging of whiskey and other distilled alcoholic beverages which consists in distilling off the original body until at least 95% of the alcoholic content is distilled off and at temperatures not exceeding 230° F. to form a part rich in alcoholic content and containing raw qualities to be removed, leaving an undistilled liquid part, subjecting at least the intermediate fractions of the distilled off part, while in the vapor form, to activated carbon to remove the raw qualities therefrom, said undistilled part containing aged whiskey qualities which would be removed if similarly subjected to said activating material while in the vapor form, bringing the undistilled part in liquid form into intimate association with a material which imparts thereto the flavor and color derived from treatment with oak and after condensing the distilled off fractions reuniting and blending them with the undistilled part which was not thus vaporized and treated.

9. The process of accelerating the aging of whiskey and other distilled alcoholic beverages, which consists in distilling off the more volatile compounds to a certain point, bringing at least a part of these more volatile compounds, while in the vapor form, into intimate contact with porous carbon, condensing the distilled compounds and uniting the condensate thus formed with the less volatile and undistilled residue.

10. The process of accelerating the aging of whiskey and other distilled alcoholic beverages, which consists in distilling off the more volatile compounds to a certain point, bringing at least a part of these more volatile compounds, while in the vapor form, into intimate contact with porous carbon, condensing the distilled compounds and uniting the condensate thus formed with the less volatile and undistilled residue, and then passing the whole body through carbon.

11. The process of accelerating the aging of whiskey and other distilled alcoholic beverages, which consists in distilling off the more volatile compounds to a certain point, bringing at least a part of these, while in the vapor form, in contact with finely divided oak and porous carbon, condensing these distilled compounds and uniting with the residue.

12. The process of accelerating the aging of whiskey and other distilled alcoholic beverages, which consists in redistilling off the more volatile compounds until the major part of the alcoholic content is distilled off, leaving a watery residue in liquid form, bringing the said more volatile compounds, while in the vapor form, into intimate contact with porous carbon, recondensing the vapors resulting from said redistillation after subjecting them to said carbon and reuniting the said watery residue, without redistillation, with the condensate resulting from said treatment of the more volatile compounds in vapor form and the recondensation thereof.

13. The process of accelerating the aging of whiskey and other distilled alcoholic beverages, which consists in distilling off the more volatile compounds until the major part of the alcoholic content is distilled off, leaving a watery residue in liquid form, bringing the said more volatile compounds, while in the vapor form, into intimate contact with porous carbon, recondensing the vapors resulting from said redistillation after subjecting them to said carbon, reuniting the said watery residue, without redistillation, with the condensate resulting from said treatment of the more volatile compounds in vapor form and the recondensation thereof, and subjecting the product to finely divided wood.

14. The process of accelerating the aging of whiskey and other distilled alcoholic beverages, which consists in redistilling off the more volatile compounds until the major part of the alcoholic content is distilled off, leaving a watery residue in liquid form, bringing at least the lower fractions of the more volatile compounds thus redistilled and while in the vapor form, into intimate contact with porous carbon, recondensing the redistilled compounds, and reuniting said watery residue, without redistillation, with the condensate resulting from the condensing of said redistilled compounds.

15. The process of accelerating the aging of whiskey and other distilled alcoholic beverages, which consists in redistilling off the more volatile compounds until the major part of the alcoholic content is distilled off, leaving a watery residue in liquid form, bringing at least the lower fractions of the more volatile compounds thus redistilled and while in the vapor form into intimate contact with porous carbon, recondensing the redistilled compounds, reuniting said watery residue without redistillation, with the condensate resulting from the condensing of said redistilled compounds, and subjecting the product to finely divided wood.

16. The process of accelerating the aging of whiskey and other distilled alcoholic beverages, which consists in redistilling off the more volatile compounds until the major part of the alcoholic content is distilled off, leaving a watery residue in liquid form, bringing at least the lower fractions of the more volatile compounds thus redistilled and while in the vapor form into intimate contact with porous carbon, recondensing the redistilled compounds, reuniting said watery residue without redistillation, with the condensate resulting from the condensing of said redistilled compounds, and subjecting the product to a coloring and flavoring material.

17. The process of accelerating the aging of whiskey and other distilled alcoholic beverages, which consists in redistilling off the more volatile compounds until the major part of the alcoholic content goes off, leaving a watery residue in liquid form, introducing and mixing oxygen with the vapors of at least the lower fractions of the more volatile compounds thus redistilled, bringing the vaporous mixture of oxygen and redistilled fractions thus formed into intimate contact with porous carbon, condensing said redistilled compounds, and reuniting said watery residue, without redistillation, with the condensate resulting from the redistillation of said compounds.

18. The process of accelerating the aging of whiskey and other distilled alcoholic beverages, which consists in redistilling off the more volatile compounds until the major part of the alcoholic content goes off, leaving a watery residue in liquid form, introducing and mixing oxygen with the vapors of at least the lower fractions of the more volatile compounds thus redistilled, bringing the vaporous mixture of oxygen and redistilled fractions thus formed into intimate contact with porous carbon, condensing said redistilled compounds, and reuniting said watery residue, without redistillation, with the condensate resulting from the redistillation of said compounds and subjecting the product to finely divided wood.

19. The process of accelerating the aging of whiskey and other distilled alcoholic beverages, which consists in redistilling off the more volatile compounds until the major part of the alcoholic content goes off, leaving a watery residue in liquid form, introducing oxygen into and causing the same to bubble through the beverage under distillation and become intimately mixed with the vapors resulting from the redistillation, bringing the vaporous mixture of oxygen and at least the lower fractions of the more volatile compounds into intimate contact with porous carbon, recondensing the said redistilled compounds, and reuniting the watery residue, without redistillation, with the condensate resulting from the recondensing of said redistilled compounds.

ELIAS HICKS HERRICK.